(12) United States Patent
Pinter et al.

(10) Patent No.: US 10,690,906 B2
(45) Date of Patent: Jun. 23, 2020

(54) MAGNETIC ACTUATOR

(75) Inventors: Stefan Pinter, Reutlingen (DE); Joerg Muchow, Reutlingen (DE); Frank Schatz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 729 days.

(21) Appl. No.: 13/307,749

(22) Filed: Nov. 30, 2011

(65) Prior Publication Data
US 2012/0147444 A1 Jun. 14, 2012

(30) Foreign Application Priority Data
Dec. 8, 2010 (DE) .................. 10 2010 062 591

(51) Int. Cl.
*G02B 26/08* (2006.01)
*H02K 33/18* (2006.01)
(Continued)

(52) U.S. Cl.
CPC .......... *G02B 26/085* (2013.01); *H02K 33/18* (2013.01); *H02K 41/0354* (2013.01); *G02B 26/105* (2013.01)

(58) Field of Classification Search
CPC .. G02B 26/0833; G02B 26/085; G02B 26/10; G02B 26/101; G02B 26/105;
(Continued)

(56) References Cited

U.S. PATENT DOCUMENTS 5,748,172 A * 5/1998 Song .................. G02B 26/0841
345/111
6,188,504 B1 * 2/2001 Murakami ........... G02B 7/1821
359/224.1
(Continued)

FOREIGN PATENT DOCUMENTS

CN 1823290 A 8/2006
CN 101031839 A 9/2007
(Continued)

OTHER PUBLICATIONS

"Silicon scanning mirror of two DOF with compensation current routing"; Si-Hong Ahn and Yong-Kweon Kim; J. Micromech. Microeng. 14 (2004) 1455-1461.
(Continued)

*Primary Examiner* — Kimberly N. Kakalec
(74) *Attorney, Agent, or Firm* — Norton Rose Fulbright US LLP; Gerard Messina

(57) ABSTRACT

A magnetic actuator includes: a plate having a main plane of extent and mounted rotatably about at least one first axis of rotation which is parallel to the main plane of extent, the plate having at least one conductor loop parallel to the main plane of extent; a magnetic bracket situated beneath the plate and having a U-shaped magnetic flux conducting rail and a hard magnet whose magnetization is perpendicular to the U-shaped opening, the magnetic bracket and the plate being aligned with one another in such a way that the opening in the magnetic bracket points toward the main plane of extent of the plate, the U-shaped magnetic flux conducting rail having a main direction of extent parallel to the first axis of rotation, and the plate being deflectable about the at least one axis of rotation by energizing the at least one conductor loop.

25 Claims, 6 Drawing Sheets

(51) Int. Cl.
*H02K 41/035* (2006.01)
*G02B 26/10* (2006.01)

(58) Field of Classification Search
CPC ......... H02K 33/12–18; H02K 41/0354; H02K 33/18; G09G 3/02–025; H04N 9/3129–3135; B81B 2201/042; H01F 2007/068
See application file for complete search history.

(56) References Cited

U.S. PATENT DOCUMENTS

| | | | |
|---|---|---|---|
| 6,388,789 B1 * | 5/2002 | Bernstein | B81B 3/0021 359/198.1 |
| 6,989,921 B2 * | 1/2006 | Bernstein et al. | 359/290 |
| 7,071,594 B1 * | 7/2006 | Yan et al. | 310/309 |
| 7,256,926 B2 * | 8/2007 | Kamiya et al. | 359/290 |
| 7,777,927 B2 * | 8/2010 | Mizoguchi et al. | 359/224.1 |
| 7,869,108 B2 * | 1/2011 | Asada et al. | 359/199.4 |
| 2002/0171901 A1 | 11/2002 | Bernstein | |
| 2005/0129353 A1 | 6/2005 | Torashima et al. | |
| 2009/0284823 A1 | 11/2009 | Chen et al. | |
| 2010/0141366 A1 * | 6/2010 | Sprague et al. | 335/219 |

FOREIGN PATENT DOCUMENTS

| | | |
|---|---|---|
| CN | 100528735 C | 8/2009 |
| CN | 101536294 A | 9/2009 |
| DE | 10 2008 042 346 | 4/2010 |
| EP | 0 778 657 | 6/1997 |
| EP | 1 858 141 | 11/2007 |
| JP | 2005266713 A | 9/2005 |
| JP | 2007304624 A | 11/2007 |
| JP | 2008076569 A | 4/2008 |
| JP | 2009089501 A | 4/2009 |
| JP | 2009109778 A | 5/2009 |
| JP | 2009265479 A * | 11/2009 |
| WO | WO 2005/078509 | 8/2005 |
| WO | WO 2010/065340 | 6/2010 |

OTHER PUBLICATIONS

"Electromagnetic Two-Dimensional Scanner Using Radial Magnetic Field"; Chang-Hyeon Ji, Member, IEEE, Moongoo Choi, Sang-Cheon Kim, Ki-Chang Song, Jong-Uk Bu, Member, IEEE, and Hyo-Jin Nam; Journal of Microelectromechanical Systems, vol. 16, No. 4, Aug. 2007.

* cited by examiner

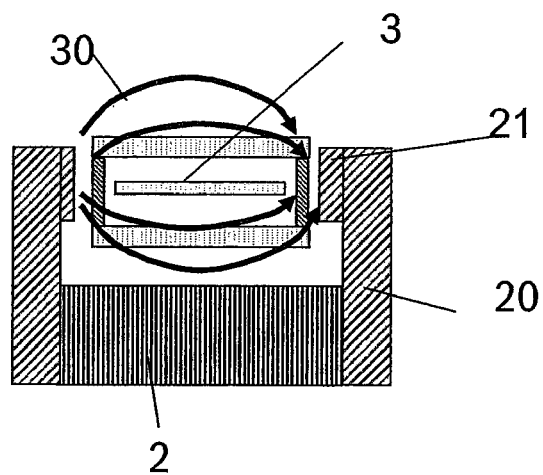
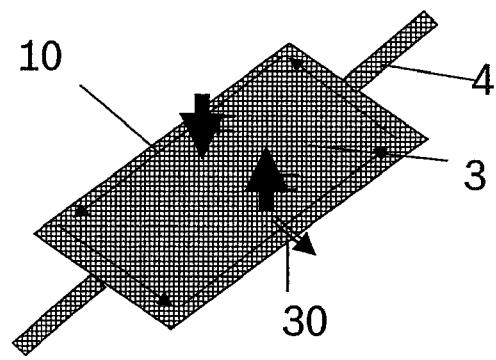
Fig. 1a                    Fig. 1b
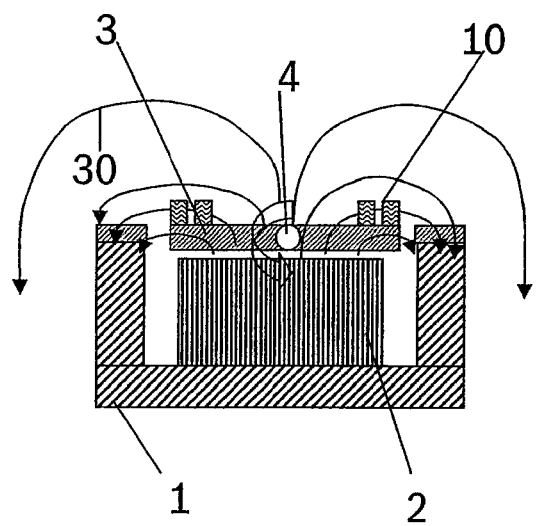
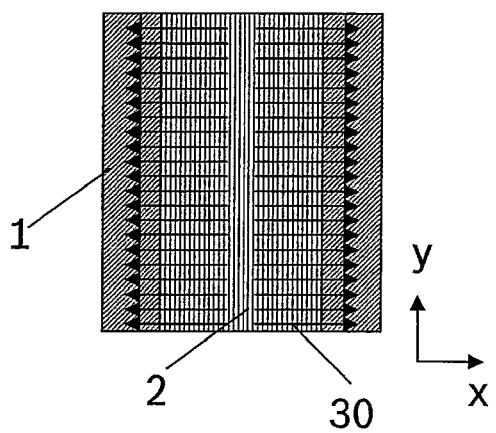
Fig. 2a                    Fig 2b

MAGNETIC ACTUATOR

BACKGROUND OF THE INVENTION

1. Field of the Invention

The present invention relates to a magnetic actuator having a plate, which is mounted rotatably about at least one axis of rotation.

2. Description of the Related Art

There are various approaches for magnetically driving micromirrors. The essential advantage of a magnetic drive in comparison with an electrostatic drive is that the torques technically achievable through the magnetic Lorentz force are higher than the torques achievable by electrostatic force.

Published European Patent document EP 778657 B1 proposes a gimbal-mounted mirror which is mounted rotatably about two axes of rotation, an internal axis and an external axis. The axes of rotation are perpendicular to one another. One coil for the internal axis and another coil for the external axis are situated on two gimbal-mounted vibrating bodies. The magnetic field is approximately homogeneous over the entire chip and forms a 45° angle to each of the two axes of rotation. Two configurations are proposed for generating the magnetic field. In a first variant, a micromirror is placed at a 45° angle between two hard magnets (permanent magnets). In a second variant, four magnets of opposing polarities are used. The effective magnetic field, which is available for the corresponding axes, is reduced by a factor of $\sqrt{2}$ due to the 45° angle. Both variants of the magnetic field generation require a very voluminous configuration.

Published international patent application document WO 2005/078509 A2 also proposes a gimbal-mounted mirror which is mounted rotatably about two axes. However, with this device only one coil is provided for the drive about two axes. A low-frequency quasistatic signal and also a high-frequency resonant signal are applied to this coil. The resonant signal excites the rotation of the internal axis via the so-called "rocking mode."

Published international patent application document WO 2010/065340 A2 describes the relatively complex configuration of permanent magnets of differing polarities and flux conduction layers for generating a magnetic field in a 45° direction. The effective magnetic field perpendicular to the corresponding axes is likewise reduced by the factor of $\sqrt{2}$.

Published German patent application documents DE 102008042346 A1 and published European patent application document EP 1858141A2 propose configurations for generating a magnetic field component or a torque perpendicular to the quasistatic axis, so that when a high-frequency alternating field is applied, a resonant movement about axis 4b, which is perpendicular to the quasistatic axis, is induced.

In these specific embodiments of a micromirror driven by Lorentz force, unidirectional magnetic fields running in the plane of the chip surface are implemented. A deviation from the preferential direction constitutes an incomplete embodiment. The technical efforts are concentrated on minimizing such incomplete specific embodiments. To achieve a high magnetic field having the greatest possible unidirectionality, the magnetic flux conductor components used are relatively voluminous.

A radially symmetrical magnetic field for implementing a biaxial microscanner is proposed in the publication "Silicon scanning mirror of two DOF with compensation current routing"; Si-Hong Ahn and Yong-Kweon Kim; 3. Micromech. Microeng. 14 (2004) 1455-1461. The radially symmetrical field is implemented by a magnet, whose direction of magnetization is perpendicular to the plane of the chip. The configuration is thus relatively simple, which is an advantage with respect to the manufacturing costs. The fountain shape of the magnetic field lines includes a radial component running in the plane of the chip. Only this component is technically usable, while some of the other components are not usable and some would even lead to undesirable transverse forces. The usable magnetic field strength claimed in the publication is 0.1 T.

The magnetic field is increased by a configuration of two magnets in the publication "Electromagnetic Two-Dimensional Scanner Using Radial Magnetic Field"; Chang-Hyeon Ji, Member, IEEE, Moongoo Choi, Sang-Cheon Kim, Ki-Chang Song, Jong-Uk Bu, Member, IEEE, and Hyo-Jin Nam; Journal of Microelectromechanical Systems, vol. 16, no. 4, August 2007. The central cylindrical magnet, whose direction of magnetization is perpendicular to the chip surface, is surrounded by a ring-shaped magnet of the opposite polarity. Both magnets are secured on a disk-shaped iron plate, so that a portion of the magnetic flux is returned. The usable magnetic field was increased up to 0.5 T by this configuration, but this design is just as complex as that of scanners, which operate on the basis of a unidirectional magnetic field.

The packaging must be taken into account in ascertaining the manufacturing price of a micromirror. Mounting of magnets during assembly is assessed as being very cost-intensive. Mounting of magnets of differing polarities in particular requires even greater effort during assembly due to the mutual repulsion.

If a hard magnet having one direction of magnetization is used in the case of a magnetic yoke, for example, then the remagnetization may take place after assembly, which would greatly reduce the effort and thus the costs.

BRIEF SUMMARY OF THE INVENTION

The present invention provides a configuration which enables rotation of a plate, which is suspended by at least one spring, out of a plane and about at least one axis of rotation. For example, a micromirror may be mounted on the plate. The force is generated by Lorentz force.

On the other hand, to achieve an adequate force to drive such a configuration, the usable magnetic field should be as high as possible. The magnetic field should preferably be applied over the entire printed conductor. In order to generate the same force, a lower magnetic field would have to be compensated by a higher current, more printed conductors, or a greater distance of the printed conductors from the axis of rotation, which entails various disadvantages. Excessively high currents result in excessive heating, and an excessive distance from the axis of rotation is identical to a larger structural shape and too many windings increase the internal resistance.

On the other hand, the assembly costs in particular should be low because they represent a high proportion of the total value creation. Since the handling of magnets during assembly operations is very complex and susceptible to problems, it is absolutely essential to use only one magnet which may be remagnetized at the end of the manufacturing process.

The main emphasis in this question lies in the development of a system which operates quasistatically. Since the required forces in quasistatic deflection are several orders of magnitude greater than those of the resonant deflection, depending on the quality of the system, experience has shown that the implementation is much more difficult. Resonant excitation of the configuration should essentially also be possible through the proposed magnetic drive.

The overall configuration including the magnet should have the smallest possible structural size. The height of the magnetic unit, including the flux conductor, should be on the order of magnitude of a few millimeters. The structural size and simplicity of the configuration should permit fabrication in lots, in particular in a wafer composite.

According to the present invention, a magnetic actuator having a plate which is mounted rotatably about at least one axis of rotation and a magnetic configuration situated beneath the plate are proposed. The magnetic configuration includes a U-shaped rail of magnetic flux-conducting material and a hard magnet, which is situated in this rail and whose direction of magnetization is perpendicular to the opening in the rail. The main direction of extent of the magnetic configuration lies in the longitudinal direction of the rail. This magnetic configuration is referred to here as a magnetic bracket. The plate has one main direction of extent. The axis of rotation is parallel to the main direction of extent. The plate has at least one conductor loop parallel to the main plane of extent. The magnetic configuration is oriented with the rail opening toward the plate, and the two main directions of extent are the same. The plate becomes deflectable about the at least one axis of rotation by energizing the conductor loop.

With the configuration according to the present invention, high driving torques due to a high magnetic field strength are advantageous with a simple and thus inexpensive design at the same time. In addition to using only one magnet having one direction of magnetization, it is easy and inexpensive here to implement large-scale industrial manufacture of U-shaped rails from flux-conducting material.

The present invention preferably relates to implementing a uniaxial mirror.

Micromirrors are intended for use in mobile telephones, in which magnetic field-sensitive elements, for example, a fluxgate compass, are provided. For this reason, the magnetic stray field is to be reduced as much as possible. In contrast to the known concepts, the magnetic field is reduced to a noncritical extent by the U-shaped shielding of the hard magnet with flux conductors on at least three sides. Only a weak magnetic field emanates from the end faces because the direction of magnetization runs parallel to the opening. Thus essentially only the magnetic field direction running perpendicularly out of the opening in the bracket remains. Since the stray field emerges in only one direction, it may be positioned in a noncritical direction, in which no sensitive components are situated. Alternatively or additionally, the stray field may be reduced to an acceptable extent by simple shielding.

To achieve a maximum torque, it is advantageous if, firstly, the conductor loop is at a maximum distance from the axis of rotation and, secondly, if the magnetic field is at its maximum at this location. In contrast to the radially symmetrical field, which is implemented by a circular or ring-shaped magnet, the proposed design has a usable magnetic field which has a high homogeneous value at an equal distance from the axis of rotation over the entire length. In particular, this permits additional freedom in design. The torque may be increased by simply lengthening the configuration.

BRIEF DESCRIPTION OF THE DRAWINGS

FIG. 1a schematically shows a magnetic yoke having a rotatable plate according to the related art.

FIG. 1b schematically shows a rotatable plate having a conductor loop for the electric drive in the related art.

FIGS. 2a and 2b schematically show a first exemplary embodiment of a magnetic actuator according to the present invention having a magnetic bracket and a plate rotatable in one axis.

DETAILED DESCRIPTION OF THE INVENTION

Figure 3:
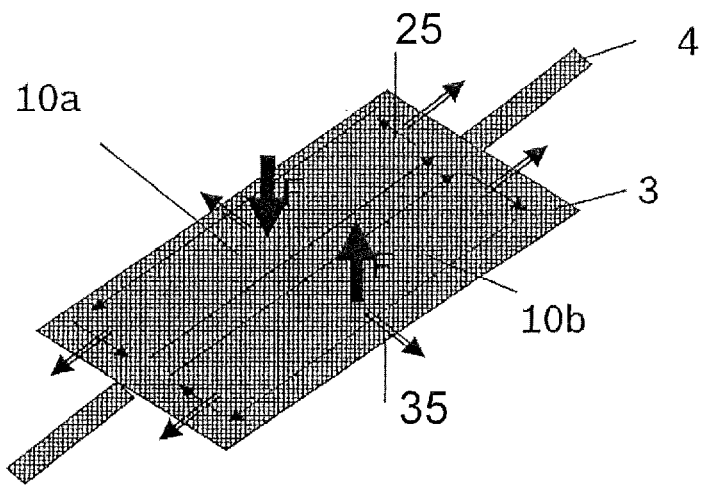
FIG. 3 schematically shows a plate rotatable in one axis and having two conductor loops.

FIG. 1a schematically shows a magnetic yoke having a rotatable plate in the related art. A configuration known in the related art for implementing magnetic field 30 for a micromirror operating on the basis of Lorentz force forms the magnetic yoke. FIG. 1a shows a normal magnetic yoke 20 made of a soft magnetic flux conductor having a simple gap. The mirror and a conductor loop are situated on a rotatable plate 3 in the gap. If the conductor loop is energized, i.e., an electrical current is flowing through it, then a torque acts on a plate in the unidirectional magnetic field generated by the magnetic yoke. Since the current flows in different directions on the two sides of the axis, this yields a rectified torque about the axis. In this regard, FIG. 1b schematically shows a rotatable plate 3 having a conductor loop 10 for the electric drive in the related art. In its simple embodiment, the magnetic yoke allows the mirror to be tilted about an axis 4. This axis is operated quasistatically in the known embodiments in the related art.

Starting with the yoke design, this yields a minimal width of the configuration perpendicular to the axis of rotation from various boundary conditions. In order for the yoke to be able to carry the magnetic flux, a minimal wall thickness of side legs 20 is necessary. To deflect the magnetic field into the desired direction, a certain minimum width of pole shoes 21 is necessary. A frame is necessary to secure the rotatable plate. It has a minimal width to ensure the required robustness. If it is necessary to protect the mirror from corrosion or to operate it in a vacuum in a resonant operating mode because of a desired high quality, then an even wider frame is necessary. To achieve the required torque, a minimal distance of the printed conductors from the axis of rotation is necessary.

FIG. 2 schematically shows a first exemplary embodiment of a magnetic actuator according to the present invention having a magnetic bracket and a plate rotatable in one axis. An axially symmetrical magnetic field in the plane of the chip, i.e., in the main plane of the plate, which is preferably manufactured from a semiconductor material, particularly preferably from silicon, may be implemented in a much more compact configuration, such as a magnetic bracket, for example. Magnet 2 is situated beneath the chip with its direction of magnetization perpendicular to the surface of the chip. The magnet is in a U-shaped rail 1 of a flux-conducting material. Magnetic field lines 30 run in the form of two divergent rolls away from the surface of the magnet. The component in the xy plane is usable for a force in the z direction, i.e., field lines running in the main plane of the rotatable plate. The magnetic field lines may be manipulated through the precise shape of U-shaped rail 1. To achieve a maximum torque, the field line component running in the xy plane is maximized at the chip edge because printed conductors 10 are positioned in this area to achieve a maximum possible torque. In addition, FIG. 2b schematically shows the magnetic bracket in a top view and an axially symmetrical divergent magnetic field generated by the magnetic bracket.

To generate a torque which rotates plate 3 out of the plane, two conductor loops are implemented on the opposing halves of the plate with respect to the axis of rotation and are energized in the opposite, i.e., opposing direction, of rotation. FIG. 3 schematically shows a plate rotatable in an axis 4 having two conductor loops. A force upward and a force downward—opposite the axis of rotation 4—are generated through two conductor loops 10a, 10b.

End faces 25 of loops 10a and 10b do not produce any perpendicular forces on the plate because the magnetic field and the direction of the current run parallel here. The printed conductors leading back in the middle of the plate produce a force, which counteracts the desired force acting perpendicularly on the plate. However, this contribution is negligible because of the small distance from the axis of rotation and the much smaller magnetic field in the xy plane. On the whole, exactly as in the case of a conductor loop and a unidirectional B field in the proposed configuration of an axially symmetrical B field and two conductor loops on the plate, this yields an equally large torque about axis 4 in a first approximation. However, if the two conductor loops are energized in the same direction of rotation, end faces 25 produce a total torque, which acts on the plate about the second axis of rotation 35.

Another important advantage of the proposed configuration is the lower stray field in comparison with open magnets. Except for one direction, the opening in the bracket, the magnet is shielded by flux conductors, greatly reducing the stray field. Since the stray field emerges in only one direction, there is the possibility of minimizing the negative effects of the stray field through clever orientation or through targeted shielding. In comparison with open magnets, the stray field is also reduced in the direction of the bracket opening because most of the field is already guided in the flux conductor.

Figure 4:
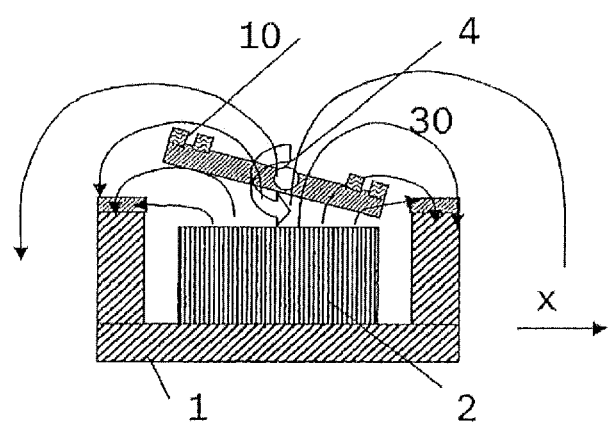
FIG. 4 shows the tilting of the plate which is rotatable in one axis under the action of force on the conductor loops through which current is flowing.

FIG. 4 shows the tilting of the plate, which is rotatable in one axis, under the influence of the force on the conductor loops through which the current is flowing. This schematically shows in cross section the plate tilted in the magnetic field and the course of the field lines. This shows clearly that the field line density increases with a decrease in the distance from the surface of the magnet, i.e., the Lorentz forces increase with a reduction in the distance of the printed conductors from the surface of the magnet.

Assuming a plate which has a width of 4 mm and vibrates about the axis of rotation by 7°, for example, then the printed conductors are shifted upward by approximately 200 μm and are shifted downward on the opposite side. In the calculations of the forces prevailing at the point of maximum deflection, the field strengths 200 μm above and below must thus be taken into account, starting from the zero position. One advantage of the proposed configuration is that the force on the part of the plate which is closer to the magnet increases to a greater extent than the force on the other part of the plate decreases. Therefore the effective torque increases with an increase in deflection on the whole.

Figure 5:
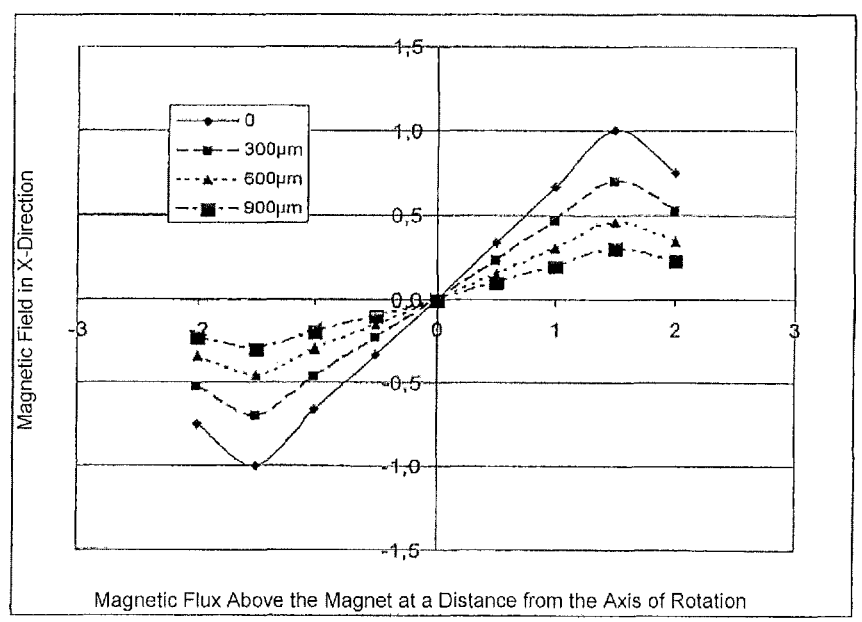
FIG. 5 shows a diagram of the magnetic flux above the magnet at different distances from the axis of rotation.

FIG. 5 shows a diagram of the magnetic flux above the magnet at various distances from the axis of rotation. This shows the magnetic flux density along the x direction, which is of interest, directly above the magnet and at a distance of 300 μm, 600 μm and 900 μm above the magnet. The change in sign means that the direction of the magnet has changed.

Figure 6:
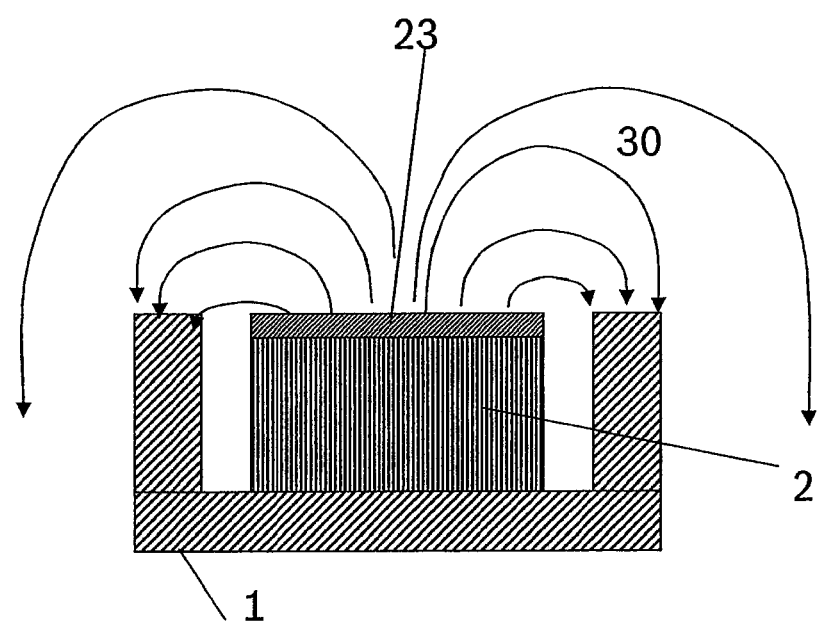
FIG. 6 shows a magnetic bracket having flux-conducting segments on the open side.

FIG. 6 shows a magnetic bracket having flux-conducting segments on the open side. Flux-conducting segments 23 on the top side of the magnet increase the field strength emerging from the pole core. Thus a magnetic field strength of 2 Tesla is achievable at the surface, where the field lines leave the pole core, because a soft magnetic material may be remagnetized up to this flux density. In contrast to that, a permanent magnet made of a hard magnetic material is saturatable to maximal 1.4 T. Due to the increased magnetization on emergence from the material, the field strength at the location of the printed conductors may be increased. At the same time, the magnetic field is guided in the x direction to a greater extent, which results in a further increase in the component of the magnetic field in the plane of the rotatable plate.

The following calculations include an estimate of the internal resistance and the maximum power of the magnetic actuator according to the present invention, having a magnetic bracket and a movable plate.

| | | |
|---|---|---|
| $l_{Winding}$ = | 2 * (4e-3 m + 2e-3 m) | 12e-3 m |
| w * t = | 50e-6 * 4e-6 | 2e-10 m$^2$ |
| R = 2 nrl/wt = | 2 * 5 * 1.7e-8 Wm * 12e-3 m/2e-10 m$^2$ | 10 W |
| F = nlBl = | 5 * 5e-2 A * 5e-1T * 4e-3 m | +0.5 mN |
| $F_{opposite}$ = nlBl = | 5 * 5e-2 A * 0.5e-1T * 4e-3 m | −0.05 mN |
| M = | +0.5 mN * 3.5e-3 m | 1.75 μNm |
| $M_{opposite}$ = | 0.5 mN * 0.5e-3 m | −0.025 μNm |
| $W_{max/mean}$ = | 5e-2 A$^2$ * 10 W | 25/8 mW |

In the above-mentioned section, a rough estimate of the internal resistance and the maximum power (at the maximum angular deflection) is shown. An average magnetic field of 0.5 T is assumed. A coil made of copper (Cu) having five windings is also assumed, the height of the printed conductor being assumed to be 4 μm and the width 50 μm. For these assumptions, an input resistance of 10Ω and a maximum power of 25 mW are obtained for both coils. The average power is approximately 8 mW.

The embodiment of a magnetic actuator having a magnetic bracket and a movable plate as described here may be used for a quasistatic mirror and for a resonant mirror as the drive. In the design of a resonant mirror, which usually operates at higher frequencies, more rigid springs would have to be used and the masses and moments of inertia would have to be adapted.

The springs which create the opposing force against the rotation of the plate out of the plane may be designed in various ways. Torsion springs are the simplest form. In addition, however, other springs, for example, meandering springs, bending springs, or progressive springs may also be used, if they allow rotation of the plate about axis 4.

One aspect of the present invention is the reduction in the magnetic stray field. An open magnet having an edge dimension of 3 mm has a stray field of approximately 0.5 T at a distance of 1 mm in the direction of its magnetization. The magnetic field is guided through flux conductors, i.e., the stray field outside of the flux conductor is reduced. The magnetic bracket is a suitable configuration for reducing the stray field inasmuch as it shields all sides, except for the open side of the bracket. The stray field ascertained with the simple magnetic bracket amounts to 1 mT at a distance of 1 mm in the shielded bottom area and 20 mT over the open area of the bracket.

The emergence of the magnetic field lines may be reduced by a layer 23 of flux conductors on the open side of magnet 2, as shown in FIG. 6. Flux conductor layer 23 may be applied to pole core 2 over the entire area or as a structured layer. The field lines emerging from the end face of the magnet are collected, so to speak, by the flux conductor segments and guided in the direction of magnetic bracket 1.

Through the proposed configurations, the stray field may be reduced by orders of magnitude.

Figure 7:
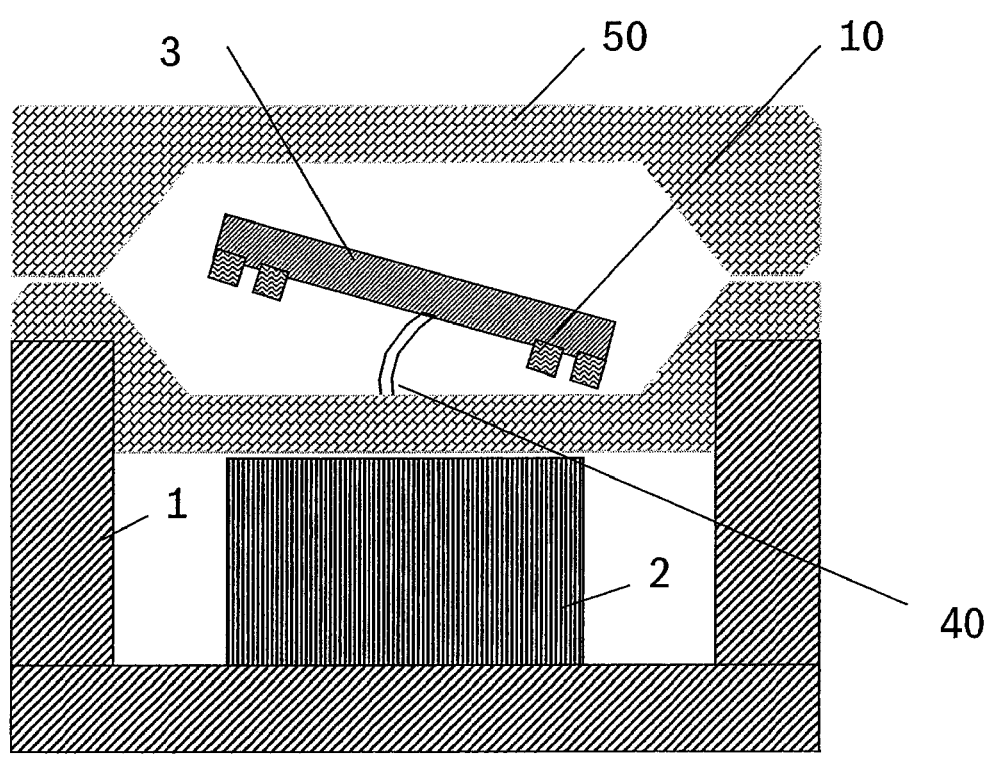
FIG. 7 shows a magnetic actuator according to the present invention having a magnetic bracket and a rotatable plate having a central spring suspension.

FIG. 7 shows a magnetic actuator according to the present invention having a magnetic bracket and a rotatable plate having a central spring suspension. A central spring suspension 40, as shown in this exemplary embodiment, is one possible form of the support of rotatable plate 3. Such a central spring suspension may be designed in such a way that tilting of plate 3 in one or more directions is possible. Plate 3 is also surrounded by its own housing 50, for example.

The housing material is selected in such a way that the magnetic field of the actuator may penetrate through it and thus plate 3 situated in housing 50 is still drivable to a tilting movement or a rotational movement.

An additional aspect of the present invention is the creation of a drivable micromirror, which is movable in at least one axis, having the magnetic actuator as the drive. For this purpose, plate 3, which is described in the preceding exemplary embodiments of the magnetic actuator according to the present invention, is designed as a plate having a reflective surface or is provided with a mirror element at least on the side of plate 3 facing away from the opening in the magnetic bracket or is covered with a reflective material. In the exemplary embodiment in FIG. 7, the material of housing 50 is additionally selected to be transparent for the radiation to be reflected.

Figure 8:
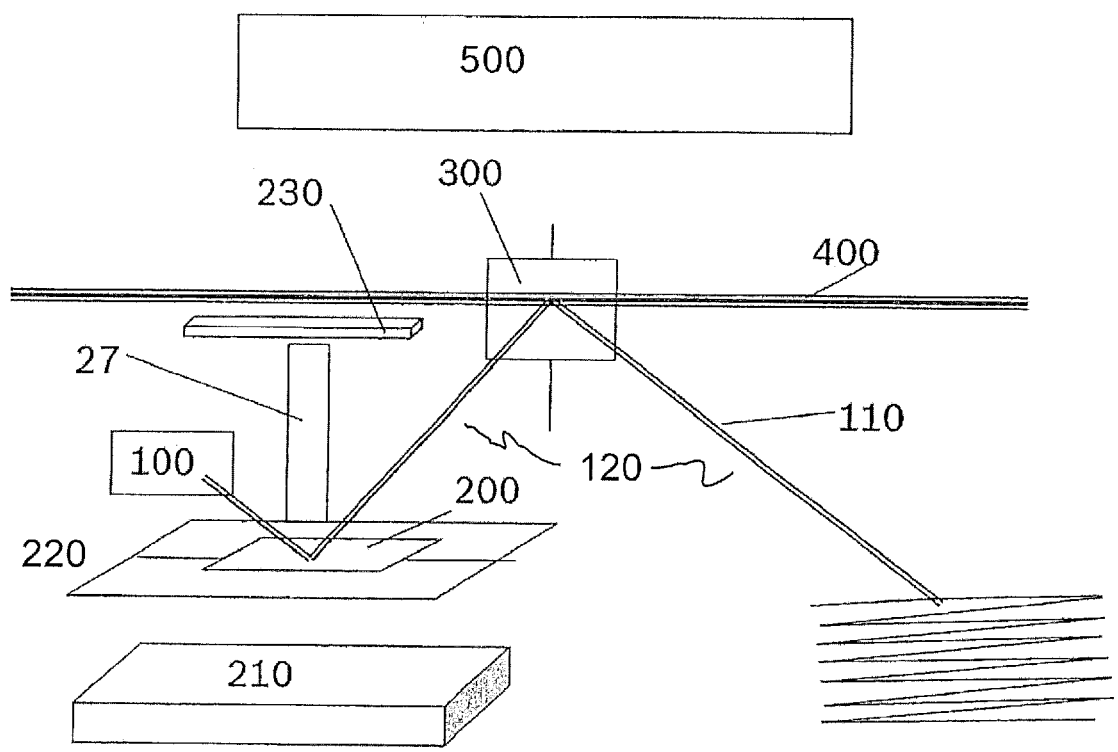
FIG. 8 shows the design of a 2-mirror system having a magnetic actuator according to the present invention and a flux-conductor shielding.

An additional aspect of the present invention is the creation of a magnetic actuator for the drive of a micromirror. FIG. 8 shows the design of a 2-mirror system having a magnetic actuator according to the present invention and flux-conductor shielding. This shows a light source in the form of a laser 100, emitting a beam of light 110. Beam of light 110 is reflected by a first mirror 200. Mirror 200 is driven magnetically according to the present invention and has for this purpose a magnetic bracket 210, a magnetically driven mirror element 220, and a flux conductor shield 230. Beam of light 110 is subsequently reflected by a second driven mirror 300. The movable mirrors reflect the beam of light 110 in such a way that a two-dimensional light pattern 120 may be written onto a projection surface. In this way, an optical imaging system or a so-called optical 2D scanner, for example, may be implemented.

Starting from a 2-mirror configuration like that shown in FIG. 8, the stray field of the first mirror toward the open side of the magnetic bracket may be reduced by a flux conductor segment 230 in the form of a shielding plate which is fixed on an opposing printed circuit board 400, where the second mirror having an axis of rotation perpendicular to the axis of rotation of the first mirror is located. This flux conductor segment 230 prevents the emergence of field lines in areas where there are electronic components 500 which are sensitive to magnetic stray fields, for example. A spacer 27 prevents the magnetic force from resulting in a mutual attraction of magnetic bracket and shielding 230.

What is claimed is:

1. A magnetic actuator, comprising:
a plate having one main plane of extent and mounted rotatably about at least one first axis of rotation which is parallel to the main plane of extent, the plate having at least one conductor loop parallel to the main plane of extent; and
a magnetic bracket situated beneath the plate, the magnetic bracket having a U-shaped magnetic flux conducting rail and a hard magnet whose magnetization is perpendicular to the U-shaped opening;
wherein the hard magnet is disposed inside the U-shaped opening, a bottom surface of the hard magnet being above and in direct contact with a bottom surface of the U-shaped opening,
wherein the magnetic bracket and the plate are aligned with one another in such a way that the opening in the magnetic bracket points toward the main plane of extent of the plate, and wherein the U-shaped magnetic flux conducting rail has a main direction of extent which is parallel to the first axis of rotation, and wherein the plate is deflectable about the first axis of rotation by energizing the at least one conductor loop,
wherein the plate has (i) two conductor loops parallel to the main plane of extent, and (ii) two surface areas in the main plane of extent separated by the first axis of rotation,
wherein in the plate one of the conductor loops is situated only in one of the surface areas and the other conductor loop is situated only in the other surface area,
wherein the two conductor loops are displaced from one another only in a single direction that is perpendicular to the first axis of rotation,
wherein each of the two conductor loops have a length that intersects a second axis that is perpendicular to the first axis of rotation,
wherein the two surface areas are confined to edge areas of the plate,
wherein the plate has a first side that is longer than a second side,
wherein the first side is parallel to the main direction of extent,
wherein the magnetic bracket produces a magnetic field that is coplanar with the main plane of extent in which the two conductor loops are located,
wherein a Lorentz-force generated by the magnetic field is perpendicular to the main plane of extent in which the two conductor loops are located,
wherein when the plate is at rest the plate is coplanar with an xy plane,
wherein the U-shaped magnetic flux conducting rail causes the magnetic field to include a plurality of field line components that run parallel to each other and to the second axis within the xy plane, and
wherein a torque about the first axis of rotation is generated on the plate by energizing the two conductor loops in opposite directions.

2. The magnetic actuator as recited in claim 1, wherein the magnetic bracket has a hard magnet, and wherein one of a whole-area or a structured flux conductor layer is applied to an open side of the hard magnet.

3. The magnetic actuator as recited in claim 1, wherein a shield fixed by a spacer is situated opposite the opening in the magnetic bracket to reduce a magnetic stray field toward an open side of the magnetic bracket.

4. The magnetic actuator as recited in claim 1, wherein the plate is mounted rotatably about the first axis of rotation via one of a torsion spring, a meandering spring, a bending spring, or a progressive spring.

5. The magnetic actuator as recited in claim 1, wherein the plate is connected to a central spring suspension which allows tilting of the plate in at least one direction.

6. The magnetic actuator as recited in claim 1, wherein the conductor loops are disposed on a surface of the plate that faces away from the hard magnet.

7. The magnetic actuator as recited in claim 1, wherein each of the conductor loops is located on the plate at a maximum distance from the first axis of rotation.

8. The magnetic actuator as recited in claim 1, wherein the two conductor loops are electrically disconnected from one another in the plate.

9. The magnetic actuator as recited in claim 1, wherein a center region of the plate that is traversed by a longitudinal axis of the plate is outside a region of the plate enclosed by a first of the conductor loops and is outside a region of the plate enclosed by a second of the conductor loops.

10. The magnetic actuator as recited in claim 1, wherein a clearance exists between a top surface of the hard magnet and a bottom surface of the plate, a height of the clearance being delimited by the top surface of the hard magnet and the bottom surface of the plate.

11. The magnetic actuator as recited in claim 1, wherein a direction of the magnetization of the hard magnet is perpendicular to the plate.

12. The magnetic actuator as recited in claim 1, wherein a flux-conducting material that is different than a material of the hard magnet is disposed on a top surface of the magnet.

13. The magnetic actuator as recited in claim 1, wherein each of the two conductor loops includes a first linear extension that is parallel to the main direction of extent and is longer than any other linear extension of the conductor loop of the two conductor loops to which the first linear extension respectively belongs.

14. The magnetic actuator as recited in claim 1, wherein:
each of the two conductor loops includes a pair of parallel segments that extend parallel to the first axis,
in each of the two conductor loops, a first one of the parallel segments is closer to the first axis than is a second one of the parallel segments, and
in each of the two conductor loops a distance between the first segment and the segment is smaller than a distance of the first segment to the first axis.

15. A micromirror system, comprising:
a magnetic actuator including:
a plate having one main plane of extent and mounted rotatably about at least one first axis of rotation which is parallel to the main plane of extent, the plate having at least one conductor loop parallel to the main plane of extent; and
a magnetic bracket situated beneath the plate, the magnetic bracket having a U-shaped magnetic flux conducting rail and a hard magnet whose magnetization is perpendicular to the U-shaped opening;
wherein the hard magnet is disposed inside the U-shaped opening, a bottom surface of the hard magnet being above and in direct contact with a bottom surface of the U-shaped opening,
wherein the magnetic bracket and the plate are aligned with one another in such a way that the opening in the magnetic bracket points toward the main plane of extent of the plate, and wherein the U-shaped magnetic flux conducting rail has a main direction of extent which is parallel to the first axis of rotation, and wherein the plate is deflectable about the first axis of rotation by energizing the at least one conductor loop, and wherein the rotatably mounted plate is provided with one of a reflective surface, a mirror element, or a reflective material on a side of the plate facing away from the opening in the magnetic bracket,
wherein the plate has (i) two conductor loops parallel to the main plane of extent, and (ii) two surface areas in the main plane of extent separated by the first axis of rotation,
wherein in the plate one of the conductor loops is situated only in one of the surface areas and the other conductor loop is situated only in the other surface area,
wherein the two conductor loops are displaced from one another only in a single direction that is perpendicular to the first axis of rotation,
wherein each of the two conductor loops have a length that intersects a second axis that is perpendicular to the first axis of rotation,
wherein the two surface areas are confined to edge areas of the plate,
wherein the plate has a first side that is longer than a second side,
wherein the first side is parallel to the main direction of extent,
wherein the magnetic bracket produces a magnetic field that is coplanar with the main plane of extent in which the two conductor loops are located,
wherein a Lorentz-force generated by the magnetic field is perpendicular to the main plane of extent in which the two conductor loops are located,
wherein when the plate is at rest the plate is coplanar with an xy plane,
wherein the U-shaped magnetic flux conducting rail causes the magnetic field to include a plurality of field line components that run parallel to each other and to the second axis within the xy plane, and
wherein a torque about the first axis of rotation is generated on the plate by energizing the two conductor loops in opposite directions.

16. The micromirror system as recited in claim 15, further comprising:
a second mirror;
wherein the micromirror system represents a 2D scanner, the second mirror having an axis of rotation which is perpendicular to the first axis of rotation of a first micromirror, the second mirror being situated opposite the first micromirror in such a way that a laser beam striking the mirror is deflected in two directions.

17. The micromirror system as recited in claim 15, wherein the conductor loops are disposed on a surface of the plate that faces away from the hard magnet.

18. The micromirror system as recited in claim 15, wherein each of the conductor loops is located on the plate at a maximum distance from the first axis of rotation.

19. The micromirror system as recited in claim 15, wherein the two conductor loops are electrically disconnected from one another in the plate.

20. The micromirror system as recited in claim 15, wherein a center region of the plate that is traversed by a longitudinal axis of the plate is outside a region of the plate enclosed by a first of the conductor loops and is outside a region of the plate enclosed by a second of the conductor loops.

21. The micromirror system as recited in claim 15, wherein a clearance exists between a top surface of the hard magnet and a bottom surface of the plate, a height of the clearance being delimited by the top surface of the hard magnet and the bottom surface of the plate.

22. The micromirror system as recited in claim 15, wherein a direction of the magnetization of the hard magnet is perpendicular to the plate.

23. The micromirror system as recited in claim 15, wherein a flux-conducting material that is different than a material of the hard magnet is disposed on a top surface of the magnet.

24. The micromirror system as recited in claim 15, wherein each of the two conductor loops includes a first linear extension that is parallel to the main direction of extent and is longer than any other linear extension of the conductor loop of the two conductor loops to which the first linear extension respectively belongs.

25. The micromirror system as recited in claim 15, wherein:
   each of the two conductor loops includes a pair of parallel segments that extend parallel to the first axis,
   in each of the two conductor loops, a first one of the parallel segments is closer to the first axis than is a second one of the parallel segments, and
   in each of the two conductor loops a distance between the first segment and the segment is smaller than a distance of the first segment to the first axis.

\* \* \* \* \*